United States Patent
Green et al.

(10) Patent No.: US 9,278,343 B2
(45) Date of Patent: Mar. 8, 2016

(54) ZEOLITE BLEND CATALYSTS FOR TREATING EXHAUST GAS

(71) Applicant: Johnson Matthey Public Limited Company, London (GB)

(72) Inventors: Alexander Nicholas Michael Green, Baldock (GB); Guy Richard Chandler, Cambridge (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/472,455

(22) Filed: Aug. 29, 2014

(65) Prior Publication Data

US 2015/0064088 A1    Mar. 5, 2015

Related U.S. Application Data

(60) Provisional application No. 61/872,094, filed on Aug. 30, 2013.

(51) Int. Cl.

| | |
|---|---|
| *B01D 53/56* | (2006.01) |
| *B01D 53/86* | (2006.01) |
| *B01D 53/94* | (2006.01) |
| *B01J 29/04* | (2006.01) |
| *B01J 29/80* | (2006.01) |
| *B01J 37/02* | (2006.01) |
| *B01J 29/76* | (2006.01) |
| *B01J 29/70* | (2006.01) |

(52) U.S. Cl.
CPC .............. *B01J 29/80* (2013.01); *B01D 53/8628* (2013.01); *B01J 29/763* (2013.01); *B01J 37/0246* (2013.01); *B01D 53/9418* (2013.01); *B01D 2255/20761* (2013.01); *B01D 2255/50* (2013.01); *B01D 2255/904* (2013.01); *B01J 29/7015* (2013.01); *B01J 2229/186* (2013.01)

(58) Field of Classification Search
CPC .............. B01D 53/565; B01D 53/8628; B01D 53/9413; B01J 29/04; B01J 29/7015; B01J 29/80

See application file for complete search history.

(56) References Cited

U.S. PATENT DOCUMENTS

| | | | |
|---|---|---|---|
| 5,516,497 | A | 5/1996 | Speronello et al. |
| 5,972,203 | A * | 10/1999 | Smith et al. .................. 208/113 |
| 2012/0186229 | A1 | 7/2012 | Phillips et al. |
| 2012/0201731 | A1 | 8/2012 | Ballinger et al. |
| 2013/0272937 | A1 | 10/2013 | Tokunaga et al. |
| 2014/0112853 | A1 * | 4/2014 | Mohanan et al. .......... 423/213.5 |
| 2015/0086456 | A1 * | 3/2015 | Mohanan et al. .......... 423/213.5 |

FOREIGN PATENT DOCUMENTS

| | | |
|---|---|---|
| WO | 2011125049 A1 | 10/2011 |
| WO | 2011151711 A1 | 12/2011 |
| WO | 2012091046 A1 | 7/2012 |
| WO | 2013050964 A1 | 4/2013 |
| WO | 2013114172 A1 | 8/2013 |

\* cited by examiner

*Primary Examiner* — Timothy Vanoy
(74) *Attorney, Agent, or Firm* — Jimmie D. Johnson

(57) ABSTRACT

Provided is an improved catalyst for treating exhaust gas, particularly for selectively reducing $NO_x$, and methods for using the same, wherein the catalyst includes a blend of a transition metal promoted zeolite and an un-promoted zeolite, wherein both zeolites have the same framework type.

14 Claims, 2 Drawing Sheets

ZEOLITE BLEND CATALYSTS FOR TREATING EXHAUST GAS

CROSS REFERENCE TO RELATED APPLICATIONS

This application claims priority benefit to U.S. Provisional Application No. 61/872,094, filed Aug. 30, 2013.

BACKGROUND

1. Field of Invention:

The present invention relates to catalysts, articles, and methods for treating combustion exhaust gas.

2. Description of Related Art:

Combustion of hydrocarbon fuel produces exhaust gas that contains, in large part, relatively benign nitrogen ($N_2$), water vapor ($H_2O$), and carbon dioxide ($CO_2$). But the exhaust gas also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of undesirable components, preferably by a process that, in turn, does not generate other noxious or toxic substances.

$NO_x$, which includes nitric oxide (NO), nitrogen dioxide ($NO_2$), and nitrous oxide ($N_2O$), is a burdensome component to remove from exhaust gas generated by lean burn engines (e.g., diesel engines and gas turbines). The reduction of $NO_x$ to $N_2$ is particularly problematic in lean burn exhaust gas because the exhaust gas contains enough oxygen to favor oxidative reactions instead of reduction. Notwithstanding, $NO_x$ can be reduced by a process commonly known as Selective Catalytic Reduction (SCR).

An SCR process involves the conversion of $NO_x$, in the presence of a catalyst and with the aid of a nitrogenous reducing agent, such as ammonia, into elemental nitrogen ($N_2$) and water. In an SCR process, ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. Chemical pathways for stoichiometric SCR reactions using ammonia include:

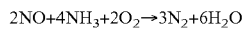

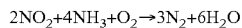

$N_2O$ is produced in limited quantities by combustion. However, undesirable processes occurring in SCR systems also include several competitive, nonselective reactions with oxygen, which is abundant in the system. These reactions can either produce secondary emissions including the production of $N_2O$. Commercial SCR catalysts, including vanadia, iron-zeolites, and copper-zeolites, all produce $N_2O$. Exhaust gas treatment systems, particularly in which the $NO_2$ content has been increased to exceed the NO level in the feed gas, allow $N_2O$ formation via pathways such as:

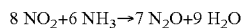

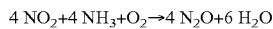

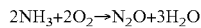

Accordingly, there remains a need for improved SCR catalysts that provide improved NOx conversion and reduced $N_2O$ make. The present invention satisfies these needs amongst others.

SUMMARY OF THE INVENTION

Generally, zeolite synthesis yields zeolites in the $H^+$ or alkali form. These zeolite forms per se have catalytic properties, but their SCR performance is typically improved by subjecting them to a cationic exchange wherein a portion of ionic species existing on the surface and/or within the framework pores is replaced by transition metal cations, such $Cu^{2+}$. The zeolite's SCR performance can, therefore, be promoted by loosely holding one or more transition metal ions to the molecular sieve's framework. Surprisingly, it has been found that certain catalyst blends containing both a metal promoted zeolite and an un-promoted zeolite of the same framework have SCR performance compared to either of these components used separately. The synergistic effect of such blends is both unexpected and unpredictable. And this surprising synergistic effect occurs over a broad temperature range.

Accordingly, in one aspect of the invention, provided is a catalyst composition for treating an exhaust gas comprising a blend of (a) a transition metal exchanged first zeolite having a first framework selected from CHA, AEI, AFX, LEV, and SFW, and (b) a second zeolite having a second framework selected from CHA, AEI, AFX, LEV, and SFW, wherein the first and second framework types are the same, and the second zeolite is primarily in at least one of $H^+$ form, $NH_4^+$ form, alkali form, or alkaline-earth form.

According to another aspect of the invention, provided is method for treating an exhaust gas comprising the step of contacting an exhaust gas stream containing $NO_x$ and a reductant with a catalyst blend described herein; wherein the contacting selectively converts at least a portion of the $NO_x$ to $N_2$ and water.

According to another aspect of the invention, provided is a method for treating exhaust gas comprising the step of contacting an emission gas containing ammonia with a catalyst article containing an oxidation catalyst and a SCR catalyst blend described herein; wherein the contacting step (a) oxidizes as least a portion of the ammonia to form $N_2$, $H_2O$, and optionally secondary $NO_x$; and (b) selectively reduces the secondary $NO_x$ into $N_2$ and $H_2O$.

According to another aspect of the invention, provided is a catalytic article comprising a catalyst composition described herein and a substrate upon and/or within which the catalyst is disposed.

According to yet another aspect of the invention, provided is system for treating exhaust gas comprising (a) a catalyst article described herein; and (b) one or more upstream components selected from a diesel oxidation catalyst, a $NO_x$ absorber catalyst, a lean $NO_x$ trap, a diesel particulate filter, an $NH_3$ injector, and an SCR catalyst; and (c) optionally a downstream ammonia slip catalyst and/or a diesel particulate filter.

DETAILED DESCRIPTION OF PREFERRED EMBODIMENTS OF THE INVENTION

Figure 1:
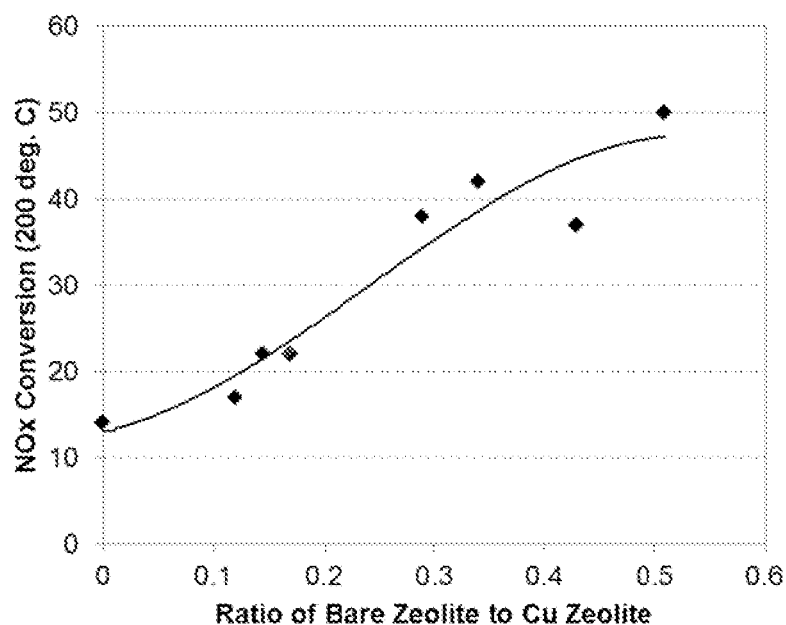
FIG. 1 shows comparative $NO_x$ conversion performance at 200° C. of certain embodiments of the present invention.

In a preferred embodiment, the invention is directed to a catalyst article for improving environmental air quality, particularly for improving flue or other exhaust gas emissions generated by lean burn internal combustion engines, power plants, gas turbines, and the like. Exhaust gas emissions are improved, at least in part, by reducing $NO_x$ and/or $NH_3$ concentrations lean burn exhaust gas over a broad operational temperature range. Useful catalysts are those that selectively reduce $NO_x$ and/or reduce ammonia slip in an oxidative environment (i.e., an SCR catalyst and/or ASC catalyst).

In certain embodiments, the catalyst is a blend of a metal-promoted zeolite and an un-promoted zeolite having the same framework. As used herein, the term blend means a uniform, heterogeneous mixture of two or more materials, either of which could be used alone for the same purpose as the blend. Preferably, the ratio of the un-promoted zeolite to the metal-promoted zeolite is about 0.1 to about 1, such as about 0.1 about 0.5, about 0.3 to about 0.5, about 0.5 to about 0.75, and about 0.5 to about 1.

As used herein, the term "metal-promoted" with respect to a zeolite means a zeolite having a solution exchanged transition metal. By corollary, "un-promoted" zeolites are those that are free of solution exchanged transition metals, e.g., zeolites in a $H^+$, $NH_4^+$, alkali metal, or alkaline earth metal form. Un-promoted zeolites include those that are synthesized in $H^+$ or alkali metal form and also synthesized zeolites that have undergone ion exchanged, wholly or partially, to produce $NH_4^+$ or alkaline earth metal forms.

The metal-promoted zeolite component of the catalyst blend is preferably promoted with a transition metal. The transition metal may be any of the recognized catalytically active metals that are used in the catalyst industry to form metal-exchanged zeolites, particularly those metals that are known to be catalytically active for selectively reducing $NO_x$ in an exhaust gases derived from a lean burn combustion process. Transition metals useful in the present invention include manganese, iron, cobalt, nickel, and copper. A particularly preferred transition metal is copper. In certain embodiments, the catalyst blend is free or substantially free of any transition metals other than copper. The term "substantially free" with respect to the presence of a transition metal, means that the catalyst does not contain the transition metal or contains only a de minimus amount of the metal. If the metal is present, its concentration is low enough so as not to affect the basic functionality of the catalyst. For example, a catalyst blend substantially free of a transition metal contains less than 0.1, less than 0.01, or less than 0.001 weight percent of the metal.

In certain embodiments, the promoter metal is present in the zeolite material at a concentration of about 0.1 to about 10 weight percent (wt %) based on the total weight of the zeolite, for example from about 0.5 wt % to about 5 wt %, from about 0.5 to about 1 wt %, from about 1 to about 5 wt %, about 2.5 wt % to about 3.5 wt %, and about 3 wt % to about 3.5 wt %. For embodiments which utilize copper the concentration of these transition metals in the zeolite material is preferably about 1 to about 5 weight percent, more preferably about 2.5 to about 3.5 weight percent.

In one embodiment, the metal-promoted zeolite component is a metal-exchanged zeolite created by blending the zeolite into a solution containing soluble precursors of the promoter transition metal. The pH of the solution may be adjusted to induce precipitation of the catalytically active metal cations onto or within the zeolite structure (but not including the zeolite framework). For example, in a preferred embodiment, the zeolite material is immersed in a solution containing copper nitrate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged zeolite may then be washed, dried, and calcined.

Generally, ion exchange of the catalytic metal cation into the zeolite pores or on the zeolite surface can be carried out at room temperature or at a temperature up to about 80° C. over a period of about 1 to 24 hours at a pH of about 7. The resulting metal-promoted zeolite material is preferably dried at about 100 to 120° C. overnight and calcined at a temperature of at least about 500° C.

The term "zeolite", as used herein, means an aluminosilicate molecular sieve having a unique framework, such as those recognized by the International Zeolite Association (IZA) Structure Commission. Preferred zeolites are synthetic zeolites. Zeolites useful in the present invention preferably have a silica-to-alumina ratio (SAR) of about 10 to about 40, such as about 10 to about 15, about 15 to about 35, or about 20 to about 25. Thus, for the present invention, zeolites are distinguishable from other types of molecular sieves, such as silicoaluminophosphates (SAPOs), aluminophosphates (AlPOs), and ferrosilicates.

The silica-to-alumina ratio of a zeolite may be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

In certain embodiments, the metal-promoted and un-promoted zeolites have the same SAR. In other embodiments, the metal-promoted and un-promoted zeolites have different SARs. In certain embodiments, the un-promoted zeolite has a higher SAR relative to the metal-promoted zeolite. For example, the metal-promoted zeolite can have a SAR of about 10 to about 14 and the un-promoted zeolite can have a SAR of about 15 to about 25; or the metal-promoted zeolite can have a SAR of about 15 to about 22 and the un-promoted zeolite can have a SAR of about 22 to about 30.

Zeolites useful in the present invention have a framework selected from the group consisting of CHA, AEI, AFX, LEV, and SFW. Any aluminosilicate isotype of these frameworks are suitable for the present invention. In certain embodiments, the zeolite is a substantially pure phase of a single framework. In other embodiments, the primary crystalline phase of the zeolite is one of the abovementioned frameworks, but also includes other crystalline phases. A substantially pure phase zeolite contains at least 95 weight percent of one framework. Mixed phase zeolites may contain 75 to 95 weight percent of one framework and 5 to 25 weight percent of a second framework. Examples of combined phases include AEI and FAU or AEI and CHA. In certain embodiments, the zeolite is an AEI/CHA intergrowth.

Scanning electron microscopy can determine the morphology and crystallite size of zeolites according to the invention. It is desirable that the mean particle size and/or mean crystal size of the aluminosilicate zeolite as measured by SEM is greater than about 0.50 μm, such those having a size range with a lower limit of about 1 μm, about 2 μm, about 3 μm, or about 5 μm; and an upper limit of about 8 μm, about 10 μm, or about 15 μm. In certain embodiments, the $d_{50}$ and/or $d_{90}$ crystalline or particle size of the zeolite is within one of the abovementioned size ranges. In certain embodiments, the zeolite crystals and/or agglomerations are milled to be within one of these size ranges. In certain embodiments, the crystal and/or particle size of the metal-promoted zeolite is the same as the crystal and/or particle size of the un-promoted zeolite. In other embodiments, the crystal and/or particle size of the metal-promoted zeolite is larger than the crystal and/or particle size of the un-promoted zeolite. In other embodiments, the crystal and/or particle size of the metal-promoted zeolite is smaller than the crystal and/or particle size of the un-promoted zeolite.

The majority of the aluminosilicate zeolite structure is constructed of alumina and silica, but metal-promoted zeolites may include framework metals other than aluminum (i.e., metal-substituted zeolites). As used herein, the term "metal substituted" with respect to a zeolite means a zeolite framework having one or more aluminum or silicon framework atoms replaced by a substituting metal. In contrast, the term "metal exchanged" means a zeolite having extra-framework or free metal ions associated with the framework structure, but not form part of the framework itself. Examples of metal-substituted frameworks include those that comprise framework copper atoms. Preferably, the un-promoted metal zeolites are not metal-substituted.

Preferably, the un-promoted zeolite component is in an $H^+$, $NH_4^+$, alkali metal, alkaline earth metal form, or some combination of one or more of these. In particularly preferred embodiments, the un-promoted zeolite is in an $H^+$ form, an $NH_4^+$ form, or a combination thereof. In certain embodiments, the un-promoted zeolite, and/or the metal-promoted zeolite, is substantially free of alkali metals, alkaline earth metals, or both alkali and alkaline earth metals. As used herein, the term "substantially free" with respect to an alkali or alkaline earth metal means that the zeolite does not have an appreciable amount of the particular metal. That is, the particular metal is not present in amount that would affect the basic physical and/or chemical properties of the zeolite, particularly with respect to the zeolite's capacity to selectively reduce or store $NO_x$. For example, a zeolite material substantially free of an alkali or alkaline earth metal contains less than 3 weight percent, more preferably less than 1 weight percent, and even more preferably less than 0.1 weight percent of that metal.

In certain embodiments, the metal-promoted zeolite component and/or the un-promoted zeolite component contains at least one of potassium, magnesium, and calcium disposed on the surface of the zeolite and/or within the zeolite pores, with calcium being particularly preferred. In certain embodiments, the catalyst is essentially free of any alkali or alkaline earth metal except calcium and potassium. In certain embodiments, the metal-promoted zeolite component and/or the un-promoted zeolite component is essentially free of any alkali or alkaline earth metal except calcium. And in certain other embodiments, the metal-promoted zeolite component and/or the un-promoted zeolite component is essentially free of any alkali or alkaline earth metal except potassium. In certain preferred embodiments, the metal-promoted zeolite component is essentially free of alkali and alkaline earth metals and the un-promoted zeolite component contains calcium, but is otherwise essentially free of alkali and alkaline earth metals.

In certain embodiments, the un-promoted zeolite contains at least about 0.1 weight percent calcium relative to the weight of the un-promoted zeolite, such as about 0.1 to about 3 weight percent, about 0.1 to about 1 weight percent, or about 1 to about 3 weight percent.

In certain embodiments, the alkali and/or alkaline earth metal (collectively $A_M$) is present in the metal-promoted zeolite material in an amount relative to the amount of promoter metal (M) in the zeolite. Preferably, the M and $A_M$ are present, respectively, in a molar ratio of about 15:1 to about 1:1, for example about 10:1 to about 2:1, about 10:1 to about 3:1, or about 6:1 to about 4:1, particularly were M is copper and $A_M$ is calcium. In certain embodiments in which the metal-promoted zeolite includes calcium, the amount of copper present is less than about 3 weight percent, such as less than about 2.5 weight percent, less than about 2 weight percent, or less than about 1 weight percent, based on the weight of the zeolite.

In certain embodiments, the relative cumulative amount of promoter metal (M) and alkali and/or alkaline earth metal ($A_M$) is present in the zeolite material in an amount relative to the amount of aluminum in the zeolite, namely the framework aluminum. As used herein, the $(M+A_M):Al$ ratio is based on the relative molar amounts of $M+A_M$ to molar framework Al in the corresponding zeolite. In certain embodiments, the catalyst material has a $(M+A_M):Al$ ratio of not more than about 0.6. In certain embodiments, the $(M+A_M):Al$ ratio is not more than 0.5, for example about 0.05 to about 0.5, about 0.1 to about 0.4, or about 0.1 to about 0.2.

The promoter metal and alkali/alkaline earth metal can be added to the molecular sieve via any known technique such as ion exchange, impregnation, isomorphous substitution, etc. The promoter metal and the alkali or alkaline earth metal can be added to the zeolite material in any order (e.g., the metal can be exchanged before, after, or concurrently with the alkali or alkaline earth metal), but preferably the alkali or alkaline earth metal is added prior to or concurrently with the promoter metal, particularly when the alkali earth metal is calcium and the promoter metal is copper.

In certain embodiments, the metal-promoted zeolite component and/or un-promoted zeolite component contain a relatively large amount of cerium (Ce). In certain embodiments, the cerium concentration in the catalyst material is present in a concentration of at least about 1 weight percent, based on the total weight of the metal-promoted and/or un-promoted zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 µm, for example less than 1 µm, about 10 nm to about 1 µm, about 100 nm to about 1 µm, about 500 nm to about 1 µm, about 10 to about 500 nm, about 100 to about 500 nm, and about 10 to about 100 nm. As used herein, the term "monomeric ceria" means $CeO_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

Catalysts of the present invention are applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising a catalyst blend as described herein coated on and/or incorporated into a substrate.

Certain aspects of the invention provide a catalytic washcoat. The washcoat comprising the catalyst blend described herein is preferably a solution, suspension, or slurry. Suitable coatings include surface coatings, coatings that penetrate a portion of the substrate, coatings that permeate the substrate, or some combination thereof. A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, $\alpha$-alumina, mullite, e.g., acicular mullite, pollucite, a thermet such as $Al_2OsFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying the catalyst blend, preferably as a washcoat, to a substrate as a layer either before or after at least one additional layer of another composition for treating exhaust gas has been applied to the substrate.

In certain embodiments, the catalyst blend is incorporated into a catalytic article or an exhaust gas treatment system wherein the catalyst blend is disposed on a substrate as a layer or zone and another composition, such as an oxidation catalyst, reduction catalyst, scavenging component, or $NO_x$ storage component, is disposed on the same substrate or a different substrate as another layer or zone. The layers or zones can be arranged on the same substrate or on different substrates and can overlap, be adjacent, and/or be consecutive. The catalyst blend can be disposed as an overlayer or an upstream zone relative to the second catalyst. Alternatively, the catalyst blend can be disposed as an underlayer or a downstream zone relative to the second catalyst. In certain embodiments, the second catalyst layer or zone contains one or more noble-metals, such as gold, silver, and platinum group metals, such as platinum, palladium, rhodium, ruthenium, or rhenium, supported on a refractory metal oxide such as alumina, ceria, titania, silica, or some combination thereof. In certain embodiments, the second catalyst layer or zone contains a metal promoted zeolite. In certain embodiments, particularly exhaust gas treatment systems which utilize a second catalyst, the catalyst blend described herein is used as a $N_2O$ reduction catalyst.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

In general, the production of an extruded solid body containing the catalyst blend involves blending the metal-promoted zeolite and the un-promoted zeolites, a binder, an optional organic viscosity-enhancing compound into an homogeneous paste which is then added to a binder/matrix component or a precursor thereof and optionally one or more of stabilized ceria and inorganic fibers. The blend is compacted in a mixing or kneading apparatus or an extruder. The mixtures also contain additives such as pore formers, plasticizers, surfactants, lubricants, dispersants to promote physical characteristics in the extruded structure or as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. Preferably, the catalyst blend is dispersed throughout, and preferably evenly throughout, the entire extruded catalyst body.

The catalyst blend may also be washcoated or otherwise applied to the extruded solid body as one or more sub-layers that reside on the surface or penetrate wholly or partly into the extruded solid body.

The catalyst blends described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The catalyst blends described herein can also reduce ammonia slip. Thus, in another embodiment, the catalyst can be formulated to favor the storage of $NH_3$ to reduce secondary $NO_x$ produced by oxidation of ammonia with oxygen, particularly a concentrations of ammonia typically encountered downstream of an SCR catalyst. In certain embodiments, the catalyst blend containing metal-promoted and un-promoted zeolites is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

Accordingly, provided is a method for the reduction of $NO_x$ compounds and/or control of $NH_3$ slip in an exhaust gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or ASC process is performed at a temperature of at least 150° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively or passively, wherein the catalyst blend described herein is disposed on the outlet side of the filter.

According to another aspect of the invention, provided is a method for treating an exhaust gas, preferably to reduction of $NO_x$ compounds and/or $NH_3$ slip in the gas, which comprises one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the catalyst blend described herein and at least one additional component for treating the exhaust gas, wherein the catalytic article and at least one additional component are designed to function as a coherent unit.

In certain embodiments, the system comprises a catalytic article comprising a catalyst blend described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

EXAMPLES

Example 1

$NO_x$ Conversion Performance of Catalyst Blends

A sample of an $NH_4^+$ form zeolite, having a CHA framework, and having a SAR of about 25 was added to a copper acetate solution at room temperature to produce a copper-exchanged zeolite. The copper-exchanged zeolite was dried and calcined at 600° C. and resulted in a zeolite having about 3.3 weight percent copper based on the weight of the zeolite.

Samples of catalyst blends were prepared by mixing a portion of the copper-promoted zeolite material described above with a portion of the same zeolite, but without the exchanged copper. Eight such samples were prepared wherein the proportion of copper-promoted zeolite in the blend ranged from about 10 weight percent to about 50 weight percent.

The copper-exchanged zeolite and the catalyst blends were hydrothermally aged at 900° C. for 3 hours.

Figure 2:
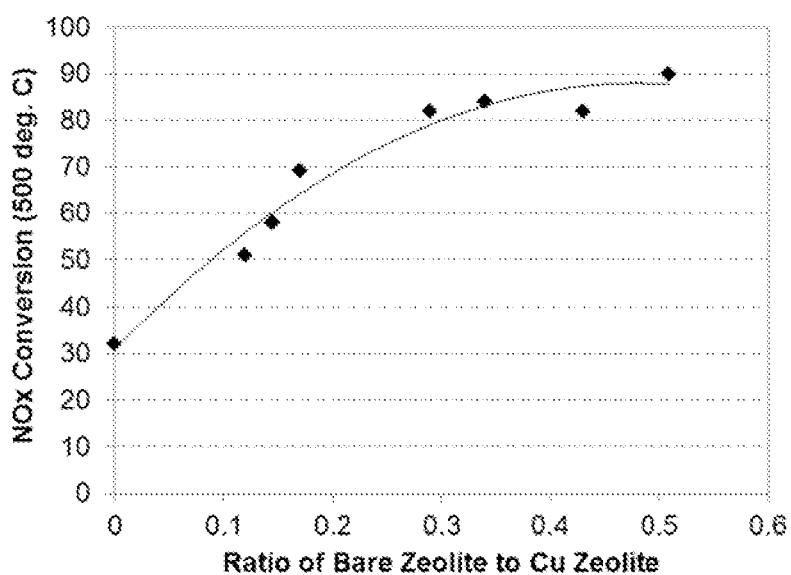
FIG. 2 shows comparative $NO_x$ conversion performance at 500° C. of certain embodiments of the present invention.

The $NO_x$ conversion performance of each of these samples were tested under similar conditions at 200° C. and at 500° C. The data of these tests are plotted in FIGS. 1 and 2.

The test results show that the addition of bare zeolite to a copper-exchanged zeolite increased the $NO_x$ conversion performance of the aged catalyst material over a broad temperature range.

Example 2

$NO_x$ Conversion Performance of Catalyst Blends

A sample of an $NH_4^+$ form zeolite, having a CHA framework, and having a SAR of about 13 was added to a copper acetate solution at room temperature to produce a copper-exchanged zeolite. The copper-exchanged zeolite was dried and calcined at about 600° C. and resulted in a zeolite having about 3.5 weight percent copper based on the weight of the zeolite.

A portion of this sample was mixed with an $NH_4^+$ form zeolite, having a CHA framework, and having a SAR of about 22, to produce a blend containing about 35 weight percent of the copper-exchanged zeolite and about 65 weight percent of the bare zeolite.

Figure 3:
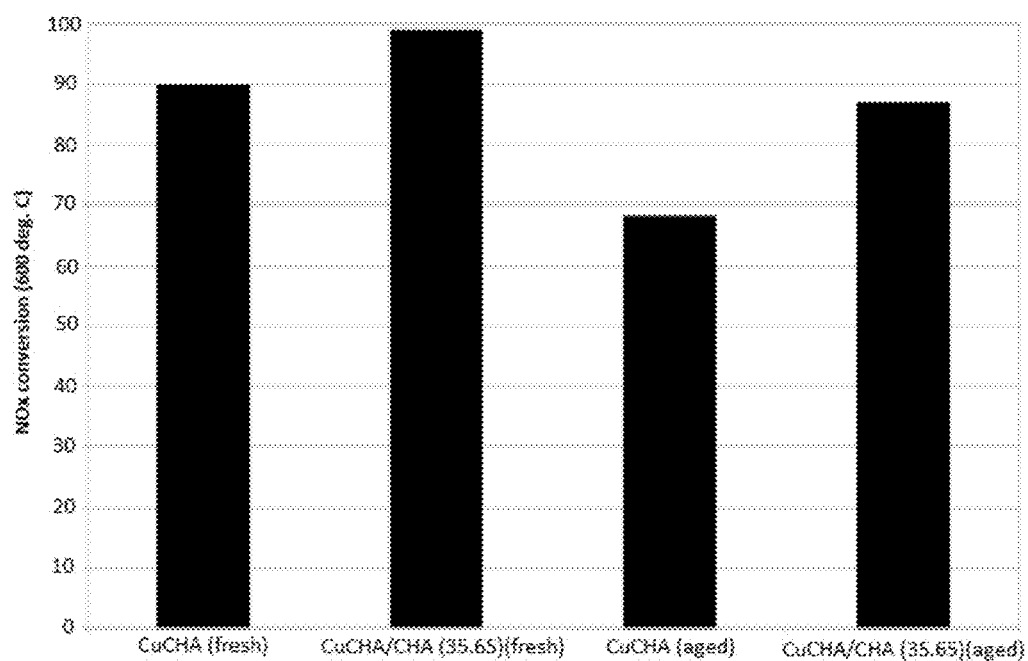
FIG. 3 shows $NO_x$ conversion performance at 600° C. of an embodiment of the present invention compared to a conventional SCR catalyst.

The fresh (i.e., un-aged) $NO_x$ conversion performance of the copper-exchanged zeolite and the blend was tested at 600° C. The $NO_x$ conversion performance of the copper-exchanged zeolite and the blend after hydrothermal aging at 900° C. for 1 hour was also tested at 600° C. The data of these tests are shown in FIG. 3.

The test results show that the addition of bare zeolite to a copper-exchanged zeolite increased the high temperature $NO_x$ conversion performance of the catalyst material.

What is claimed is:

1. A catalyst for treating an exhaust gas comprising a blend of a transition metal-promoted first zeolite and a second zeolite primarily in at least one of $H^+$ form, $NH_4^+$ form, alkali metal form, or alkaline-earth metal form, wherein the first and second zeolites have the same framework structure and the framework structure is selected from CHA, AEI, AFX, LEV, and SFW, wherein the second zeolite is essentially free of transition metals.

2. The catalyst of claim 1, wherein the first zeolite is exchanged with copper.

3. The catalyst of claim 1, wherein the second zeolite contains calcium.

4. The catalyst of claim 1, wherein the second zeolite is essentially free of non-framework metals.

5. The catalyst of claim 1, wherein the first zeolite and the second zeolite have different silica-to-alumina ratios.

6. The catalyst of claim 1, wherein the first zeolite has lower silica-to-alumina ratio relative to the second zeolite.

7. The catalyst of claim 1, wherein the first zeolite and the second zeolite independently have an silica-to-alumina ratio of about 10 to about 35.

8. The catalyst of claim 1, wherein the first and second zeolites have the same silica-to-alumina ratio.

9. The catalyst of claim 1, wherein the second and first zeolites are present in a relative ratio of about 0.1 to about 1.

10. The catalyst of claim 1, wherein the first and second zeolites have a CHA framework.

11. The catalyst of claim 1, wherein the first and second zeolites have an AEI framework.

12. A catalytic article for treating an exhaust gas comprising a porous honeycomb substrate containing a catalyst according to claim 1.

13. A method for treating an exhaust gas comprising contacting an exhaust gas stream containing $NO_x$ with a reductant in the presence of a catalyst according to claim 1; wherein the contacting selectively reduces at least a portion of the $NO_x$ to $N_2$ and water.

14. The method of claim 13, wherein said contacting occurs at a temperature of about 150-600° C.

* * * * *